US010878021B2

(12) United States Patent
Koch et al.

(10) Patent No.: US 10,878,021 B2
(45) Date of Patent: Dec. 29, 2020

(54) CONTENT SEARCH AND GEOGRAPHICAL CONSIDERATIONS

(71) Applicant: Adobe Inc., San Jose, CA (US)

(72) Inventors: Zeke Koch, San Francisco, CA (US); Baldo Faieta, San Francisco, CA (US); Jen-Chan Jeff Chien, Saratoga, CA (US); Mark M. Randall, Folsom, CA (US); Olivier Sirven, Paris (FR); Philipp Koch, Park City, UT (US); Dennis G. Nicholson, Atherton, CA (US)

(73) Assignee: Adobe Inc., San Jose, CA (US)

( * ) Notice: Subject to any disclaimer, the term of this patent is extended or adjusted under 35 U.S.C. 154(b) by 916 days.

(21) Appl. No.: 14/827,600

(22) Filed: Aug. 17, 2015

(65) Prior Publication Data
US 2017/0052981 A1   Feb. 23, 2017

(51) Int. Cl.
*G06F 16/44* (2019.01)
*G06F 16/58* (2019.01)

(52) U.S. Cl.
CPC ............ *G06F 16/444* (2019.01); *G06F 16/58* (2019.01)

(58) Field of Classification Search
USPC ........................................................ 707/722
See application file for complete search history.

(56) References Cited

U.S. PATENT DOCUMENTS

| | | |
|---|---|---|
| 5,696,964 A | 12/1997 | Cox et al. |
| 6,012,073 A | 1/2000 | Arend et al. |
| 6,157,435 A | 12/2000 | Slater et al. |
| 6,483,570 B1 | 11/2002 | Slater |
| 6,574,616 B1 | 6/2003 | Saghir |
| 6,629,104 B1 | 9/2003 | Parulski et al. |
| 6,859,802 B1 | 2/2005 | Rui |
| 6,873,327 B1 | 3/2005 | Edwards et al. |
| 6,901,378 B1 | 5/2005 | Linker et al. |
| 6,941,294 B2 | 9/2005 | Flank |
| 7,047,413 B2 | 5/2006 | Yacobi et al. |

(Continued)

OTHER PUBLICATIONS

"Examiner's Answer to Appeal Brief", U.S. Appl. No. 14/827,670, dated Nov. 28, 2018, 8 pages.

(Continued)

*Primary Examiner* — Cam Linh T Nguyen
(74) *Attorney, Agent, or Firm* — SBMC

(57) ABSTRACT

Content search and geographical consideration techniques and system employed as part of a digital environment are described. In one or more implementations, a digital medium environment is described for configuring image searches by one or more computing devices. Data is received by the one or more computing devices that identifies images obtained by users and used as part of content creation, indicates geographical locations of respective said users that obtained the images or associated with the content that includes the images, and indicates times associated with the users as obtaining the images or use of the images as part of the content. A map is built by the one or more computing devices that describes how use of the images as part of the content creation is diffused over the geographical locations over the indicated times. An image search is controlled by the one or more computing devices based on the map and a geographic location associated with the image search.

20 Claims, 7 Drawing Sheets

(56) References Cited

U.S. PATENT DOCUMENTS

| | | |
|---|---|---|
| 7,113,921 B2 | 9/2006 | Linker |
| 7,127,106 B1 | 10/2006 | Neil et al. |
| 7,249,034 B2 | 7/2007 | Schirmer |
| 7,286,723 B2 | 10/2007 | Taugher et al. |
| 7,460,737 B2 | 12/2008 | Shuster |
| 7,492,921 B2 | 2/2009 | Foote et al. |
| 7,493,340 B2 | 2/2009 | Rui |
| 7,523,102 B2 | 4/2009 | Bjarnestam et al. |
| 7,574,378 B2 | 8/2009 | Lipowitz et al. |
| 7,613,686 B2 | 11/2009 | Rui |
| 7,689,620 B2 | 3/2010 | Tan |
| 7,725,398 B2 | 5/2010 | Dawson et al. |
| 7,783,624 B2 | 8/2010 | Martinez et al. |
| 7,797,377 B2 | 9/2010 | Linker et al. |
| 7,808,555 B2 | 10/2010 | Aratani et al. |
| 7,818,261 B2 | 10/2010 | Weiskoph et al. |
| 7,920,760 B2 | 4/2011 | Yoda |
| 7,929,810 B2 | 4/2011 | Shuster |
| 7,933,765 B2 | 4/2011 | Summerlin et al. |
| 7,940,959 B2 | 5/2011 | Rubenstein |
| 7,949,625 B2 | 5/2011 | Brough et al. |
| 7,961,938 B1 | 6/2011 | Remedios |
| 7,996,266 B2 | 8/2011 | Gura |
| 8,041,612 B1 | 10/2011 | Treyz |
| 8,073,828 B2 | 12/2011 | Bowden et al. |
| 8,144,995 B2 | 3/2012 | Thompson |
| 8,155,382 B2 | 4/2012 | Rubenstein |
| 8,219,494 B1 | 7/2012 | Pride et al. |
| 8,229,800 B2 | 7/2012 | Trotman et al. |
| 8,285,082 B2 | 10/2012 | Heck |
| 8,285,084 B2 | 10/2012 | Yoda |
| 8,341,195 B1 | 12/2012 | Cole et al. |
| 8,380,005 B1 | 2/2013 | Jonsson |
| 8,396,331 B2 | 3/2013 | Jia et al. |
| 8,412,568 B2 | 4/2013 | Bastos et al. |
| 8,413,182 B2 | 4/2013 | Bill |
| 8,417,000 B1* | 4/2013 | Mendis .............. G06K 9/00671 |
| | | 382/118 |
| 8,452,049 B2 | 5/2013 | Rubenstein |
| 8,504,547 B1 | 8/2013 | Yee et al. |
| 8,515,139 B1 | 8/2013 | Nechyba et al. |
| 8,560,455 B1 | 10/2013 | Raman et al. |
| 8,571,329 B2 | 10/2013 | Thompson |
| 8,582,872 B1 | 11/2013 | Loffe et al. |
| 8,620,905 B2 | 12/2013 | Ellsworth |
| 8,625,887 B2 | 1/2014 | Li |
| 8,644,646 B2 | 2/2014 | Heck |
| 8,688,586 B2 | 4/2014 | Pride et al. |
| 8,699,826 B2 | 4/2014 | Remedios |
| 8,745,086 B2* | 6/2014 | Cardno ................ G06F 16/444 |
| | | 707/778 |
| 8,774,529 B2 | 7/2014 | Rubenstein et al. |
| 8,792,685 B2 | 7/2014 | Sangster |
| 8,812,392 B2 | 8/2014 | Shahghasemi |
| 8,831,998 B1 | 9/2014 | Cramer et al. |
| 8,879,837 B2 | 11/2014 | Usher |
| 8,898,171 B2 | 11/2014 | Tan |
| 8,934,717 B2 | 1/2015 | Newell et al. |
| 8,959,003 B2* | 2/2015 | Brugler .............. G06F 11/3082 |
| | | 345/440 |
| 9,071,662 B2 | 6/2015 | Svendsen et al. |
| 9,255,807 B2* | 2/2016 | Lee ........................ G01S 19/19 |
| 9,489,400 B1 | 11/2016 | Haitani |
| 9,571,726 B2* | 2/2017 | Horowitz ........... H04N 1/00347 |
| 9,576,046 B2* | 2/2017 | Bullotta ................ G06F 16/951 |
| 9,639,634 B1 | 5/2017 | Greene et al. |
| 9,715,714 B2 | 7/2017 | Koch et al. |
| 9,824,463 B2* | 11/2017 | Ingrassia ................ G06T 11/001 |
| 9,858,244 B1* | 1/2018 | Bjorkegren ............ G06F 17/11 |
| 9,911,172 B2 | 3/2018 | Koch et al. |
| 10,234,290 B2* | 3/2019 | Lush .................... G06F 3/0484 |
| 10,366,433 B2 | 7/2019 | Koch et al. |
| 10,453,226 B1* | 10/2019 | Burrows .............. G06T 11/206 |
| 10,475,098 B2 | 11/2019 | Koch et al. |
| 10,592,548 B2 | 3/2020 | Koch et al. |
| 2002/0033844 A1 | 3/2002 | Levy et al. |
| 2003/0151611 A1 | 8/2003 | Turpin et al. |
| 2004/0202349 A1 | 10/2004 | Erol et al. |
| 2005/0010553 A1 | 1/2005 | Liu |
| 2006/0184572 A1 | 8/2006 | Meek et al. |
| 2006/0204142 A1 | 9/2006 | West et al. |
| 2007/0097959 A1 | 5/2007 | Taylor |
| 2007/0133947 A1 | 6/2007 | Armitage et al. |
| 2007/0168513 A1 | 7/2007 | Weiskopf et al. |
| 2007/0208670 A1 | 9/2007 | Quoc |
| 2007/0297683 A1* | 12/2007 | Luo ..................... G06K 9/00664 |
| | | 382/224 |
| 2008/0144883 A1 | 6/2008 | Kacker et al. |
| 2009/0083236 A1 | 3/2009 | Shuster |
| 2009/0160859 A1* | 6/2009 | Horowitz ............. G06T 11/206 |
| | | 345/440 |
| 2009/0276453 A1 | 11/2009 | Trout et al. |
| 2009/0287669 A1 | 11/2009 | Bennett |
| 2010/0070342 A1* | 3/2010 | Hu ........................ G06Q 10/00 |
| | | 705/7.34 |
| 2010/0306344 A1 | 12/2010 | Athas et al. |
| 2011/0029408 A1 | 2/2011 | Shusterman et al. |
| 2011/0167059 A1 | 7/2011 | Fallah |
| 2011/0270697 A1 | 11/2011 | Sunkada |
| 2012/0094639 A1* | 4/2012 | Carlson ................. H04W 4/029 |
| | | 455/414.1 |
| 2012/0120097 A1 | 5/2012 | Sun et al. |
| 2012/0128239 A1 | 5/2012 | Goswami et al. |
| 2012/0179673 A1 | 7/2012 | Kelly et al. |
| 2012/0226651 A1 | 9/2012 | Chidlovskii |
| 2013/0019267 A1 | 1/2013 | Tschernutter et al. |
| 2013/0024293 A1 | 1/2013 | Tinsman et al. |
| 2013/0080881 A1* | 3/2013 | Goodspeed ............. G06F 17/21 |
| | | 715/251 |
| 2013/0117258 A1 | 5/2013 | Linsley et al. |
| 2013/0132886 A1 | 5/2013 | Mangini et al. |
| 2013/0167105 A1 | 6/2013 | Goldman et al. |
| 2013/0215116 A1* | 8/2013 | Siddique ............ G06Q 30/0643 |
| | | 345/420 |
| 2013/0335582 A1 | 12/2013 | Itasaki et al. |
| 2014/0019264 A1 | 1/2014 | Wachman et al. |
| 2014/0046792 A1 | 2/2014 | Ganesan |
| 2014/0059139 A1* | 2/2014 | Filev ....................... G06Q 50/01 |
| | | 709/205 |
| 2014/0114962 A1* | 4/2014 | Rosenburg ........... G06Q 10/063 |
| | | 707/723 |
| 2014/0122283 A1 | 5/2014 | Mehra et al. |
| 2014/0149376 A1 | 5/2014 | Kutaragi et al. |
| 2014/0189525 A1* | 7/2014 | Trevisiol ................ G06F 17/30 |
| | | 715/745 |
| 2014/0201227 A1 | 7/2014 | Hamilton-Dick et al. |
| 2014/0245358 A1* | 8/2014 | Kumar ............... H04N 21/4722 |
| | | 725/61 |
| 2014/0289134 A1 | 9/2014 | Sutton |
| 2014/0310264 A1 | 10/2014 | D'Ambrosio |
| 2014/0324838 A1 | 10/2014 | Sako et al. |
| 2014/0351021 A1 | 11/2014 | Higbie |
| 2014/0351284 A1 | 11/2014 | Ikonomov |
| 2014/0365463 A1 | 12/2014 | Tusk |
| 2015/0018094 A1 | 1/2015 | Watari et al. |
| 2015/0058998 A1 | 2/2015 | Yu et al. |
| 2015/0106628 A1 | 4/2015 | Holman et al. |
| 2015/0161258 A1 | 6/2015 | Yee et al. |
| 2015/0234864 A1* | 8/2015 | Kruckemeier ...... G06K 9/00677 |
| | | 707/725 |
| 2015/0278211 A1* | 10/2015 | Voronel ............ G06F 16/24578 |
| | | 707/728 |
| 2015/0324394 A1 | 11/2015 | Becker et al. |
| 2015/0347369 A1 | 12/2015 | Babon et al. |
| 2015/0363503 A1 | 12/2015 | Scheuerman |
| 2016/0035055 A1 | 2/2016 | Perkins et al. |
| 2016/0048985 A1* | 2/2016 | Jones ..................... G06T 11/206 |
| | | 345/593 |
| 2016/0180193 A1 | 6/2016 | Masters |
| 2016/0196589 A1* | 7/2016 | Subbarayan ....... G06Q 30/0279 |
| | | 705/319 |
| 2016/0226984 A1 | 8/2016 | Kelly et al. |
| 2016/0239680 A1 | 8/2016 | Holz |

(56) References Cited

U.S. PATENT DOCUMENTS

| | | | |
|---|---|---|---|
| 2016/0253707 A1* | 9/2016 | Momin | G06Q 30/0266 705/14.54 |
| 2016/0314203 A1 | 10/2016 | Wickenkamp | |
| 2016/0370973 A1* | 12/2016 | Morgan | G06F 17/3056 |
| 2017/0023607 A1* | 1/2017 | Bedrossian | E21B 47/0006 |
| 2017/0053103 A1 | 2/2017 | Koch et al. | |
| 2017/0053104 A1 | 2/2017 | Koch et al. | |
| 2017/0053189 A1 | 2/2017 | Koch et al. | |
| 2017/0053332 A1 | 2/2017 | Koch et al. | |
| 2017/0053365 A1 | 2/2017 | Koch et al. | |
| 2017/0053372 A1 | 2/2017 | Koch et al. | |
| 2017/0221171 A1 | 8/2017 | Koch et al. | |
| 2017/0300750 A1 | 10/2017 | Jonsson et al. | |
| 2019/0065856 A1 | 2/2019 | Harris et al. | |
| 2020/0065875 A1 | 2/2020 | Koch et al. | |
| 2020/0097764 A1 | 3/2020 | de Juan | |
| 2020/0334878 A1 | 10/2020 | Tailang | |

OTHER PUBLICATIONS

"Final Office Action", U.S. Appl. No. 14/827,836, dated Oct. 30, 2018, 14 pages.
"Non-Final Office Action", U.S. Appl. No. 14/827,645, dated Oct. 29, 2018, 12 pages.
"Pre-Interview First Office Action", U.S. Appl. No. 14/827,583, dated Oct. 5, 2018, 5 pages.
"Pre-Interview First Office Action", U.S. Appl. No. 14/827,645, dated Nov. 5, 2018, 3 pages.
"First Action Interview Office Action", U.S. Appl. No. 14/827,836, dated Mar. 22, 2017, 4 pages.
"Pre-Interview Communication", U.S. Appl. No. 14/827,670, dated Feb. 17, 2017, 3 pages.
"Pre-Interview Communication", U.S. Appl. No. 14/827,836, dated Jan. 26, 2017, 4 pages.
"Pre-Interview Communication", U.S. Appl. No. 14/827,974, dated Mar. 1, 2017, 3 pages.
"Pre-Interview Communication", U.S. Appl. No. 14/828,085, dated Feb. 28, 2017, 4 pages.
"Final Office Action", U.S. Appl. No. 14/827,836, dated Jul. 14, 2017, 24 pages.
"Notice of Allowance", U.S. Appl. No. 14/827,974, dated Apr. 19, 2017, 7 pages.
"Pre-Interview Communication", U.S. Appl. No. 15/491,943, dated Sep. 14, 2017, 3 pages.
"First Action Interview Office Action", U.S. Appl. No. 14/828,085, dated Aug. 24, 2017, 4 pages.
"First Action Interview Office Action", U.S. Appl. No. 14/827,670, dated Aug. 29, 2017, 4 pages.
"Final Office Action", U.S. Appl. No. 14/827,670, dated Feb. 1, 2018, 29 pages.
"Non-Final Office Action", U.S. Appl. No. 14/827,836, dated Apr. 4, 2018, 26 pages.
"Non-Final Office Action", U.S. Appl. No. 14/828,085, dated Mar. 26, 2018, 29 pages.
"Supplemental Notice of Allowance", U.S. Appl. No. 15/491,943, dated Feb. 6, 2018, 2 pages.
"Final Office Action", U.S. Appl. No. 14/828,085, dated Dec. 12, 2017, 29 pages.
"Notice of Allowance", U.S. Appl. No. 15/491,943, dated Oct. 24, 2017, 6 pages.
"Final Office Action", U.S. Appl. No. 14/828,085, dated Jul. 20, 2018, 28 pages.
"Restriction Requirement", U.S. Appl. No. 14/827,645, dated Jun. 18, 2018, 6 pages.
"Restriction Requirement", U.S. Appl. No. 14/827,583, dated Jul. 19, 2019, 6 pages.
"Notice of Allowance", U.S. Appl. No. 14/827,836, dated Mar. 13, 2019, 10 pages.
"Final Office Action", U.S. Appl. No. 14/827,645, dated Mar. 13, 2019, 12 pages.
"Final Office Action", U.S. Appl. No. 14/827,583, dated Mar. 8, 2019, 25 pages.
Trevisiol, "Image Ranking Based on User Browsing Behavior", SIGIR '12 Proceedings of the 35th international ACM SIGIR conference on Research and development in information retrieval, ACM ISBN: 978-1-4503-1472-5, Aug. 16, 2012, 10 pages.
"Non-Final Office Action" U.S. Appl. No. 14/827,583, dated Jul. 29, 2019, 26 pages.
"Non-Final Office Action", U.S. Appl. No. 14/828,085, dated Jun. 12, 2019, 25 pages.
"Notice of Allowance", U.S. Appl. No. 14/827,645, dated Jun. 26, 2019, 12 pages.
"Supplemental Notice of Allowance", U.S. Appl. No. 14/827,836, dated Jun. 21, 2019, 2 pages.
"Notice of Allowance", U.S. Appl. No. 14/828,085, dated Nov. 14, 2019, 11 pages.
"Corrected Notice of Allowability", U.S. Appl. No. 14/828,085, dated Jan. 2, 2020, 3 pages.
"Final Office Action", U.S. Appl. No. 14/827,583, dated Mar. 18, 2020, 28 pages.
"First Action Interview Office Action", U.S. Appl. No. 16/390,876, dated May 18, 2020, 5 pages.
"Pre-Interview First Office Action", U.S. Appl. No. 16/390,876, dated Apr. 2, 2020, 5 pages.
Fisher, "Characterizing Structural Relationships in Scenes Using Graph Kernels", Jul. 2011, 11 pages.
Fisher, "Context-Based Search for 3D Models", Dec. 2010, 10 pages.
Lee, "Context-Aware Synthesis and Placement of Object Instances", Dec. 7, 2018, 11 pages.
Ma, "Action-Driven 3D Indoor Scene Evolution", Nov. 2016, 13 pages.
Ma, "Analysis and Modeling of 3D Indoor Scene", Jun. 29, 2017, 34 pages.
Savva, "SceneSuggest: Context-driven 3D Scene Design", Feb. 28, 2017, 10 pages.
Wang, "Deep Convolutional Priors for Indoor Scene Synthesis", May 2018, 14 pages.
Yu, "The Clutterpalette: An Interactive Tool for Detailing Indoor Scenes", Mar. 2015, 11 pages.
Zhang, "What and Where: A Context-based Recommendation System for Object Insertion", Nov. 24, 2018, 12 pages.
"Advisory Action", U.S. Appl. No. 14/827,583, dated Sep. 15, 2020, 3 pages.
"Notice of Allowance", U.S. Appl. No. 16/390,876, dated Jul. 13, 2020, 5 pages.
"Patent Trial and Appeal Board Decision", U.S. Appl. No. 14/827,670, dated Jul. 2, 2020, 16 pages.
"Examiner's Answer to Appeal Brief", U.S. Appl. No. 14/827,583, dated Oct. 16, 2020, 37 pages.
"Non-Final Office Action", U.S. Appl. No. 14/827,670, dated Sep. 29, 2020, 13 pages.
"Supplemental Notice of Allowability", U.S. Appl. No. 16/390,876, dated Oct. 28, 2020, 2 pages.

* cited by examiner

CONTENT SEARCH AND GEOGRAPHICAL CONSIDERATIONS

BACKGROUND

Content sharing services have been developed as a technique to provide an online marketplace for creative professionals to sell content, such as images. As part of this, content sharing services may include functionality to make the images or other content available for licensing in response to payment of a fee, e.g., as part of a subscription service, pay per use, and so forth. A creative professional, for instance, may capture or create images that are exposed via the content sharing services to potential customers such as marketing professionals, casual users, and so on. In one such example, the creative professional captures an image of coworkers conversing at a conference table. The image is then uploaded and tagged for availability as part of the content sharing service by the creative professional, such that a marketing professional or other content consumer performing a search for "office" and "meeting" may locate the image based on the tagging of the image.

Consequently, conventional searches in digital environments are performed by matching image tags with keywords to correlate images that are desired by consumers with images created by creative professionals. However, heavy and even sole reliance on keywords and tagging in conventional search techniques could result in inaccuracies and user frustration as these techniques rely solely on a potential consumer of the image correctly guessing which tags are associated with the image by another user. This could cause lost customers and corresponding revenue to these services due to incorrect guessing and perceived inaccuracies.

SUMMARY

Content search and geographical consideration techniques and system employed as part of a digital environment are described. In one or more implementations, a digital medium environment is described for configuring image searches by one or more computing devices. Data is received by the one or more computing devices that identifies images obtained by users and used as part of content creation, indicates geographical locations of respective users that obtained the images or associated with the content that includes the images, and indicates times associated with the users as obtaining the images or use of the images as part of the content. A mapping is built by the one or more computing devices that describes how use of the images as part of the content creation is diffused over the geographical locations over the indicated times. The mapping, for instance, may describe a relative effect of one geographical location's popularity on another geographical location, e.g., via a table, relational database, and so on. An image search is controlled by the one or more computing devices based on the map and a geographic location associated with the image search.

In one or more implementations, a digital medium environment is described for performing image searches by one or more computing devices. A search request is received by the one or more computing devices for an image and an indication of a geographic location of an originator of the search request. The search is performed by the one or more computing devices based at least in part on an indication of a relative impact of a popularity of an image in one geographic location at one particular time against a target location at a second time. A result of the performed search is caused to be output by the one or more computing devices.

In one or more implementations, a digital medium environment is described for configuring image searches that includes a system having a geographic consideration module implemented at least partially in hardware. The geographic consideration module is configured to build a map that describes how use of images as part of content creation is diffused over geographical locations from data. The data identifies the images obtained by users and used as part of content creation, indicates the geographical locations of respective users that obtained the images or are associated with the content that includes the images, and indicates times associated with the users as obtaining the images or use of the images as part of the content. The system also includes a search module implemented at least partially in hardware to control image searches based on the map and geographic locations associated with the image searches.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
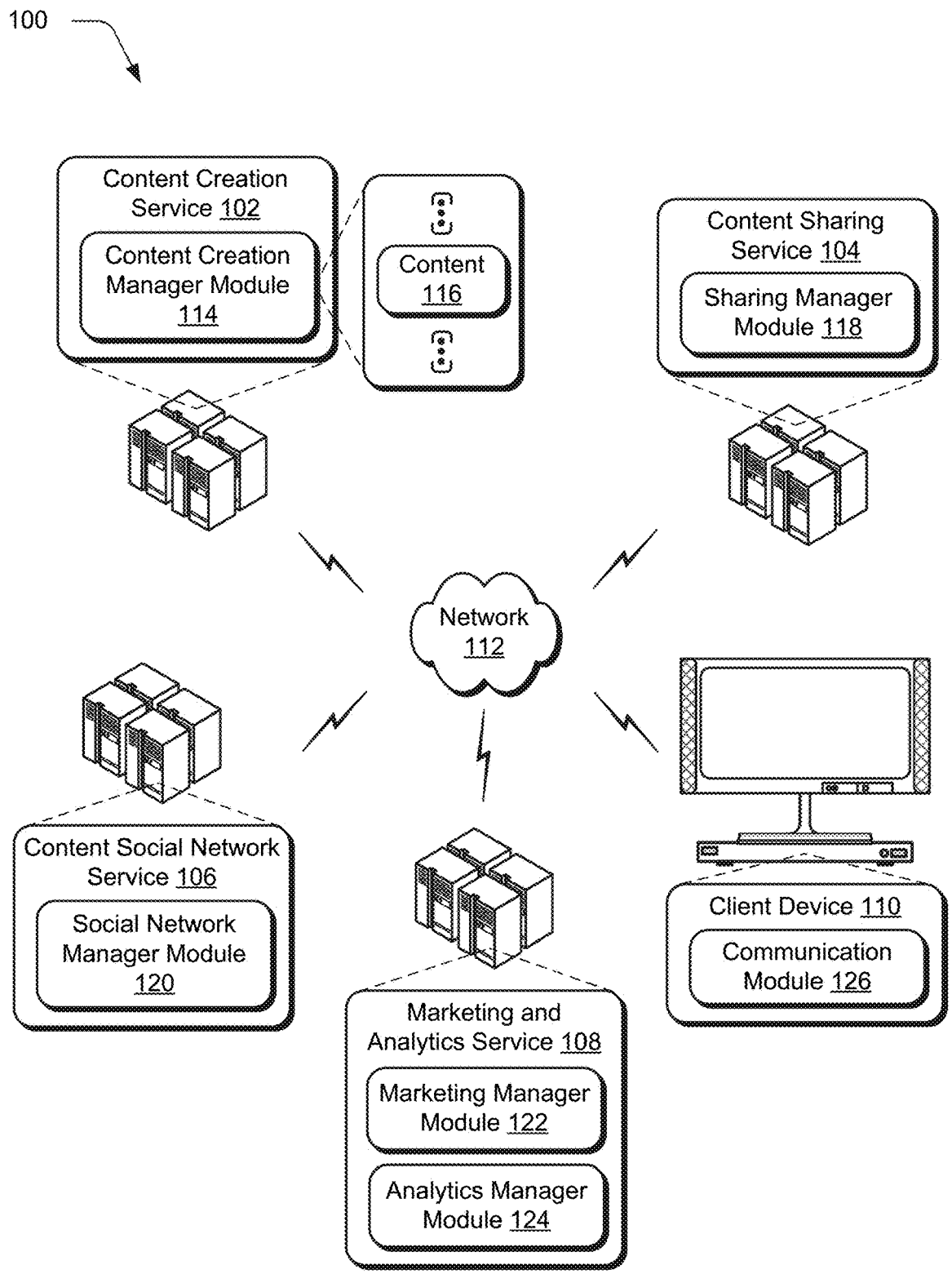
FIG. 1 is an illustration of an environment in an example implementation that is operable to employ content search and geographical consideration techniques described herein.

Content sharing services are provided via digital environments to unite content from creative professionals with consumers of the content, such as marketers. An example of this is the content sharing service Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two.

In order to unite the consumers of the images with the creators of the images, search techniques are employed such that the consumers of the images may locate potential images of interest. Thus, accuracy of the search techniques is a significant factor bringing creators and consumers of content together. However, conventional search techniques are typically limited to use of keywords that are matched with tags of images, and thus rely on a potential consumer's best guess as far as what tags a content creator used to describe the image. Accordingly, these conventional techniques could be inaccurate, inefficient, and frustrating to both creators and consumers of content and hinder interaction between the two.

In a digital environment, techniques and systems are described that introduce geographical considerations as part of a search for images available for licensing from the content sharing service and thus further improve user interaction with the service over conventional techniques that relied solely on keywords and tagging. This includes techniques and systems used to build a mapping that describes how use of images as part of content creation is diffused over geographical locations. The mapping (referred to simply as a map in the following) is configured to describe a relative impact of popularity of an image in one geographic location at one particular time against a target location at a second time, such as via a relational database, table, or other relational description. In this way, the mapping defines a location influence factor of a target location with other locations to influence an image search result.

In one such example, the content sharing service is configured to determine how images that are initially desired at a first location are subsequently desired at other locations at later points in time. An image that first exhibits popularity in New York, for instance, may then later exhibit popularity at other geographic locations. In order to describe this, the content sharing service builds a map that shows how this popularity diffuses across the other geographic locations over time, which is then used as part of subsequent searches. Through use of the map, the content sharing service increases a likelihood that the images or other content returned in a search result is of interest to a user based on a geographic location of the user in relation to other geographic locations and content consumed at those locations. As such, the content sharing service leverages knowledge of popular images as well as increases accuracy to a user of the service, which is not possible in conventional services that do not take such considerations into account. Further discussion of these and other examples is included in the following sections and shown in corresponding figures.

In the following discussion, an example environment is first described that is configured to employ the geographic consideration techniques and systems described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital environment 100 in an example implementation that is operable to employ content search and geographical consideration techniques described herein. A digital medium environment is illustrated that is configured to generate and control searches for content, which in this instance includes location of images to form content. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so on.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 7.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, and so forth, further discussion of which begins in relation to FIG. 2 in the following.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth.

As part of content creation, the client device 110 may obtain an image 128 for inclusion as part of the content from a variety of sources. For example, the image 128 may be obtained from the content creation service 102, the content sharing service 104, and so on. In the following, techniques and system are described to support searches of images or other content (e.g., songs, videos, etc.) through the use of geographical considerations associated with a search. Having now described an environment that is usable to implement the techniques described herein, examples of the content search techniques are described in the following.

Figure 2:
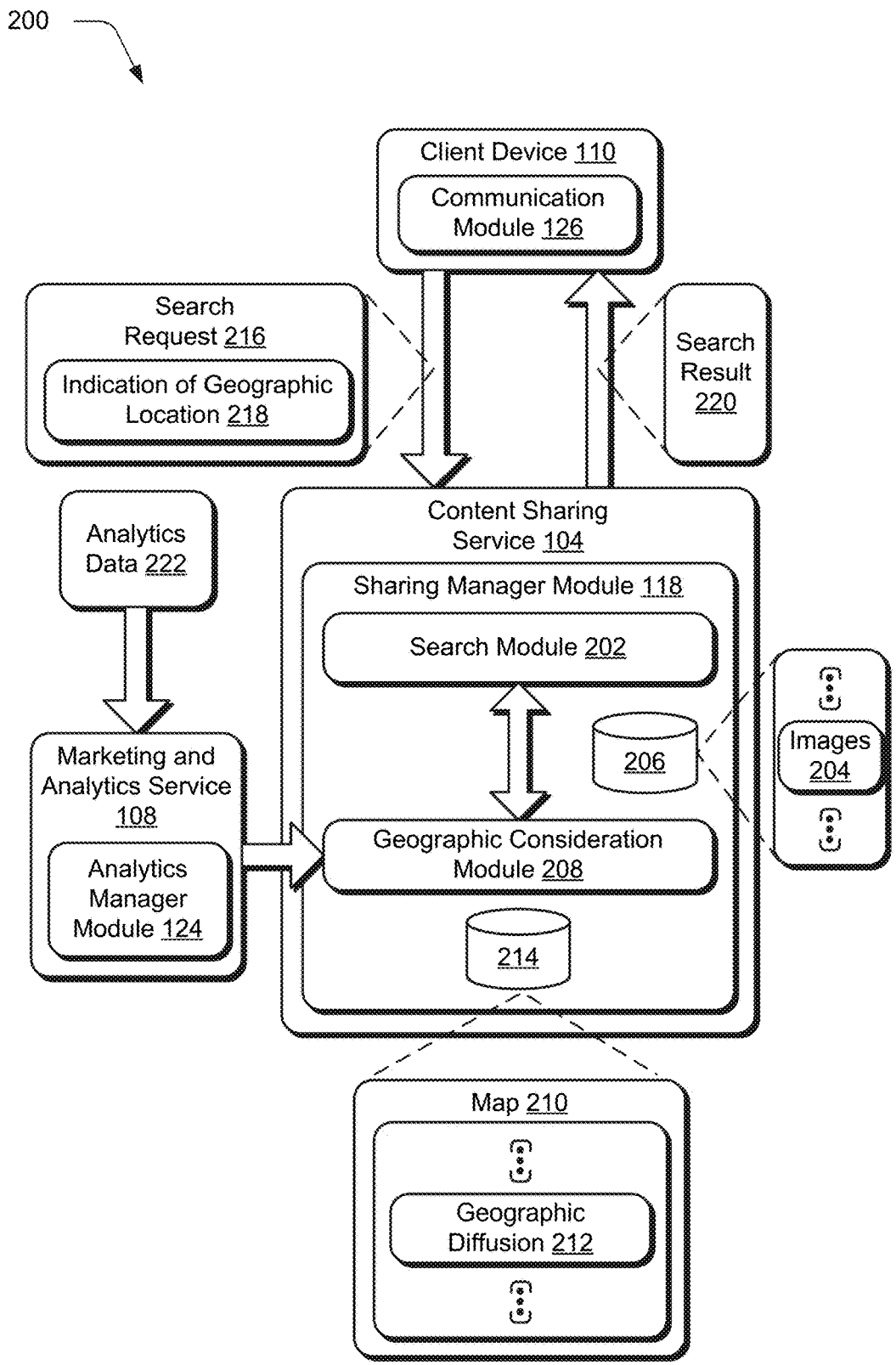
FIG. 2 depicts a system in an example implementation in which a content sharing service of FIG. 1 employs geographical considerations as part of a content search.

FIG. 2 depicts a system 200 in an example implementation in which the content sharing service 104 of FIG. 1 employs geographical considerations as part of content search. The content sharing service 104 includes a sharing manager module 118 which as described above is representative of functionality to manage services to provide images 204 created by content professionals to potential consumers, e.g., marketing professionals in a marketing campaign, a target audience of the marketing campaign, and so on.

One such example of functionality is represented by a search module 202 that is configured to search images 204. Although the images 204 are illustrated as stored in storage 206 of the content sharing service 104, these images may also be stored elsewhere, such as at a third-party service, on individual computing devices of content creation professionals, and so forth. The search module 202 is configured to locate images 204 based on keywords received as part of a search request, e.g., to match keywords "running shoes" with images tagged with the same or similar words as further described in relation to FIG. 4.

The sharing manager module 118 is also illustrated as including a geographic consideration module 208, which is representative of functionality to generate a map 210 that describes diffusion of images 204 or other content over geographic locations over a period of time. The map 210 may then be used for subsequent searches by the search module 202 to leverage knowledge of previous images obtained at one location for output as part of a search result associated with another location.

In order to generate the map 210, the geographic consideration module 208 may obtain data from a variety of different sources. For example, users of a plurality of client devices 110 may originate search requests 216 that are communicated via the network 112 to the content sharing service 104. The search request 216 are associated with an indication of geographic location 218, such as an IP address of the client device 110, a manually indicated geographic location, and so on. For example, a content creation professional may indicate a geographic location 218 of a target audience that is to consume content that includes the image, a target audience of a client that commissioned the content, and so on. Search results 220 are then provided back to the client device 110 that include images 204 based on the search request 216. The sharing manager module 202 may then track which images are actually obtained from the search result 220, e.g., downloaded, licensed, and so on, as part of content creation. Thus, in this example the data describes previous interactions with the service which may be used to guide subsequent searches based on geography as further described below.

In another example, analytics data 222 is processed by an analytics manager module 124. The analytics data 222 may be used to describe use of images by third-party services as part of content consumption. For example, the analytics data 222 may describe use of images as part of posts to a social network service, such as Facebook®, Twitter®, and so on. The analytics data 222 may also describe a geographic location of an originator of the post as well as geographic locations of users associated with replies, "shares," or other interactions with the image. Thus, in this example the data describes previous interactions outside of the service which may be used to guide subsequent searches based on geography as further described below through use of a map 210 that describes this diffusion.

Figure 3:
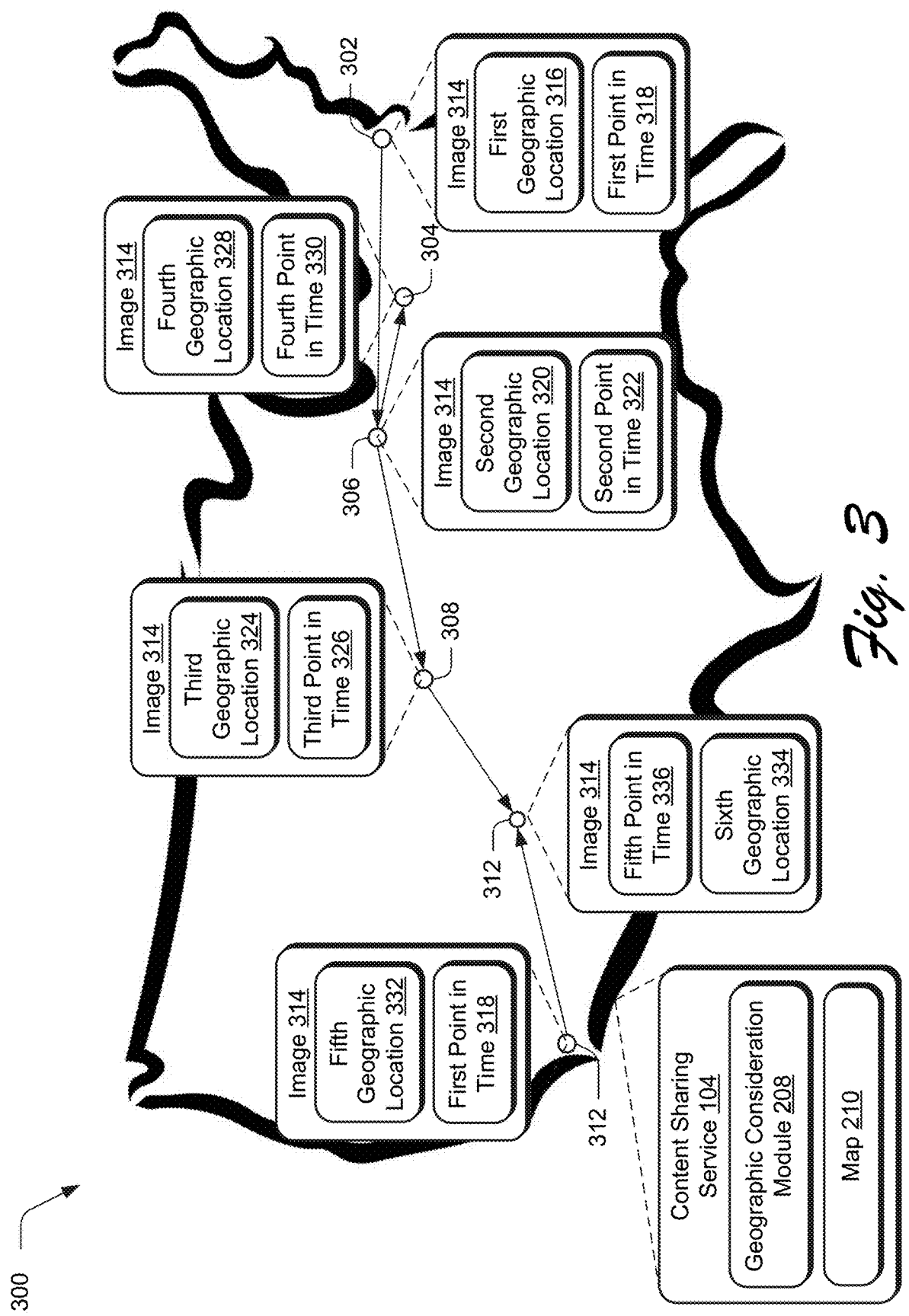
FIG. 3 depicts an example map showing diffusion of images as obtained by different geographic locations at different points in times.

FIG. 3 depicts an example map 300 showing diffusion of images as obtained at different geographic locations at different points in times. In this example, the map 300 shows a country (e.g., the United States) and includes geographic locations of cities that include New York 302, Columbus 304, Chicago 306, Denver 308, Los Angeles 310, and Albuquerque 312. Data obtained by the geographic consideration module 208 is processed to describe how use of the images as part of the content creation is diffused over geographical locations at corresponding times. The data, for instance, may be collected based on licensing of images 204 from the content sharing service 104, through use of analytics to determine image inclusion as part of content (e.g., posts to a social network service), and so forth as further described below.

In this example, the geographic consideration module 208 determines that an image 314 has first gained popularity at a first geographic location 316 (e.g., New York 302) at a first point in time 318. This popularity may be determined in a variety of ways, such as consumption over a threshold amount of times, based on a change in rate of consumption, "number of mentions," and so forth.

Further processing by the geographic consideration module 208 then determines from the data that the image 314 then gained popularity at a second geographic location 320 (e.g., Chicago 306) at a second subsequent point in time 322 to that of the first point in time 318. This process continues such that the geographic consideration module 208 then determines that the image 314 then gained popularity at a third geographic location 324 (e.g., Denver 308) at a third point in time 326 and a fourth geographic location 304 (e.g., Columbus) at a fourth point in time 330.

Continuing with this example, the geographic consideration module 208 also determines that the image 314 gained popularity at a fifth geographic location 332 (e.g., Los Angeles 312) as the first point it time 318 that is similar to when the image 314 gained popularity at the first geographic location 316. Lastly, the geographic consideration module 208 also determines that the image 314 gained popularity at a sixth geographic location 334 (e.g., Albuquerque 312) at a fifth point in time 336. From this the geographic consideration module 208 is able to tell how popularity of the image 314 has diffused across the country, which is used to generate a map 210 describing this diffusion.

In the illustrated example, the image 314 first gains popularity in New York 302 and Los Angeles 312, followed by Chicago 306, Denver 308, Columbus 304 and then Albuquerque 312 and thus the map 210 may describe this flow from one geographic location to another. The map 210 also describes an amount of time taken to diffuse from one location (e.g., New York 302) to another, e.g., a time difference between the first point in time 318 to the second point in time 322 and so on.

Thus, the map 210 may both describe a relationship of geographic locations in diffusion of image consumption as well as an amount of time taken for that diffusion. The search module 202 may then use the map 210 to generate searches based on geographic diffusion 212 considerations. Continuing with the example of FIG. 3, a search request may be received by the content sharing service 104 that is associated with third geographic location 324, e.g., Denver, such as by originating by a user located in Denver 308, an indication that the image is intended for a target audience in Denver 308, and so forth.

The search module 202 may therefore perform a search using keywords as part of the search request 216 and also the geographic indication 218. Through use of the map 210 and geographic diffusion 212 indicated therein, the search module 202 also leverages previous knowledge of images obtained by users at the first, second, and fifth geographic locations 316, 320, 318 are previous points in time based generally on a difference between the third point in time 326 and the first and second points in time 318, 322.

For instance, a difference between the third point in time 326 and the second point in time 322 may be three days and therefore the search module 302 may leverage knowledge of which images are obtained (e.g., licensed, downloaded, used) by users at the second geographic location 320 three days ago in order to configure search results 220 for users at the third geographic location 324. Likewise, the difference between the third point in time 326 and the first point in time 318 may be two weeks and therefore the search module 302 may leverage knowledge of which images are obtained by users at the first and fifth geographic locations 316, 322 (e.g., New York 302 and Los Angeles 312) two weeks ago to generate the search result for the users at the third geographic location 324. In this way, the search results may be configured based on the map 210 to leverage knowledge of which images are obtained by users at other geographic locations previously. Users may associate an indication 318 of a geographic location with a search request 216 in a variety of ways, an example of which is described in the following and shown in a corresponding figure.

Figure 4:
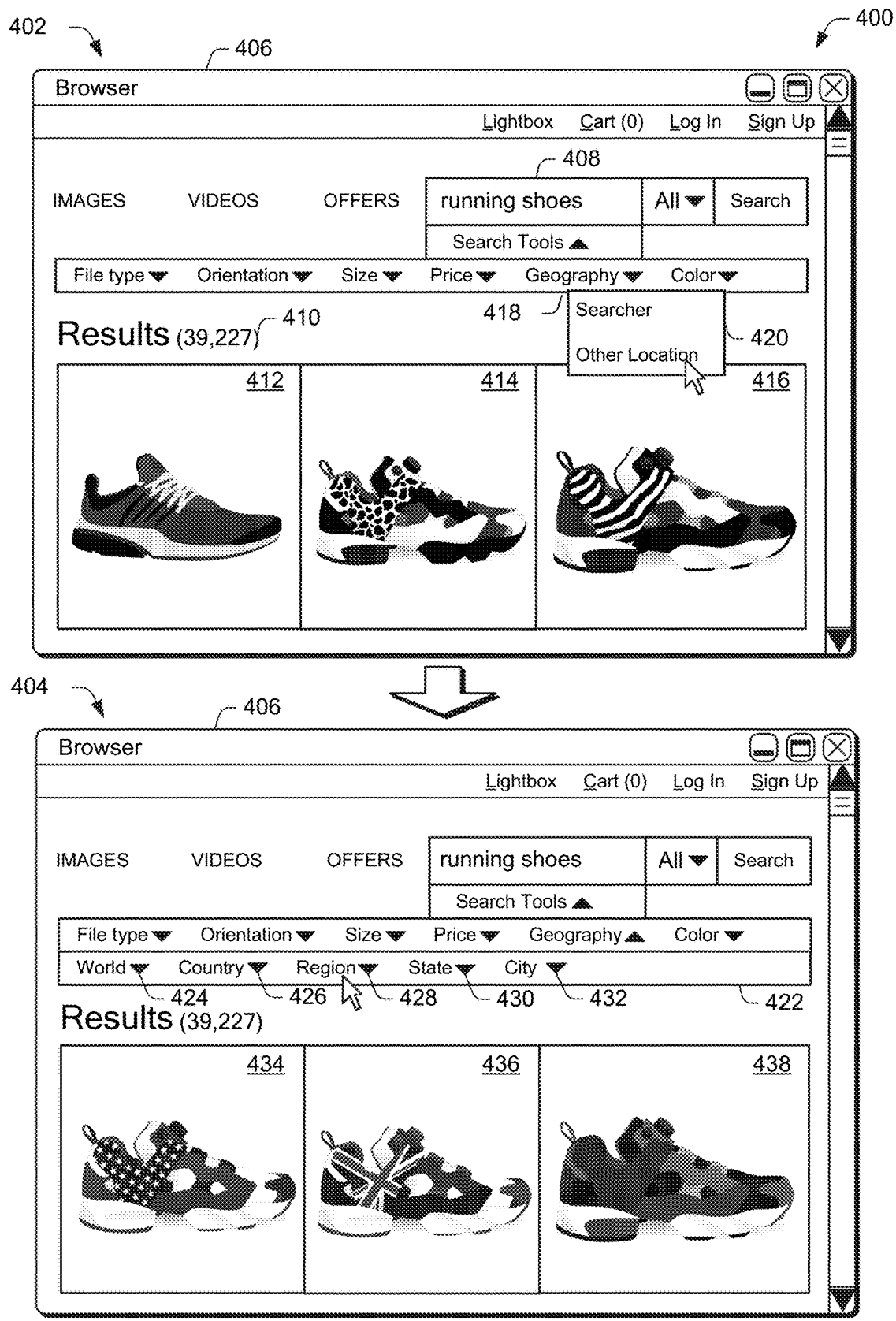
FIG. 4 depicts a user interface configured to associate a geographic location with a search.

FIG. 4 depicts an example implementation 400 showing interaction with a user interface to associate a geographic location with a search that is then leveraged using a map 210 of FIG. 2 to perform a search by taking geographic considerations 212 into account. This example implementation is illustrated using first and second stages 402, 404. At the first stage, a user interface 406 is displayed at a client device 110 of FIG. 1 that is generated and transmitted by the content sharing service 104. The user interface 406 includes a search input portion 408 that is configured to receive keywords that are matched to tags of images as described previously. An example of this is illustrated for "running shoes" that includes 39,227 results 410 that include images 412, 414, 416 of different types of running shoes and different patterns that include block colors, animal prints, and camouflage, respectively.

The user interface 406 also includes an option 418 to filter the results 410 based on geographical considerations, which is illustrated as included in a menu bar but other examples are also contemplated. Selection of the option 418 in this example causes output of a menu 420, via which, a user may select which geographic location to associate with the search. This includes an option to associate a geographic location of a "searcher," which is the originator of the search request or some other location, e.g., for a target audience, client, and so on as described above. In one or more implementations, a plurality of geographic locations may be associated with the search.

Regardless of which option is selected, another menu bar 422 is output in response as shown at the second stage 404 that includes options to associate geographic locations based on world 424 locations (e.g., by continent or region of continent), country 426 locations, region 428 locations (e.g., Pacific Northwest), stages 430, cities 432, and so on such as locations within a city such as boroughs for New York. Once associated, the search module 202 filters the results 410 based on the map 210 as described above, which in this example lowers the number of results considerably and thus vastly improves user efficiency.

In the illustrated example, the map 210 indicates diffusion from one or more other specific geographic locations to the location associated with the search over a particular amount of time. Accordingly, that amount of time is used by the search module 202 to provide images 434, 436, 438 that were obtained at the geographic location previously according to that amount of time. The images 434, 436, 438 in this example indicate that running shoes with flag patterns are popular in images 434, 436 of running shoes, along with another image 438 of a camouflage pattern. In this way, the map 210 may be used along with data describing previously obtained content (e.g., images) at geographic locations to include that content in a search result, thereby improving a likelihood that a user at that geographic location and at that point in time will desire those images. Additional examples are also contemplated, further discussion of which is described in relation to the following procedures.

Example Procedures

The following discussion describes geographical consideration techniques and systems that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
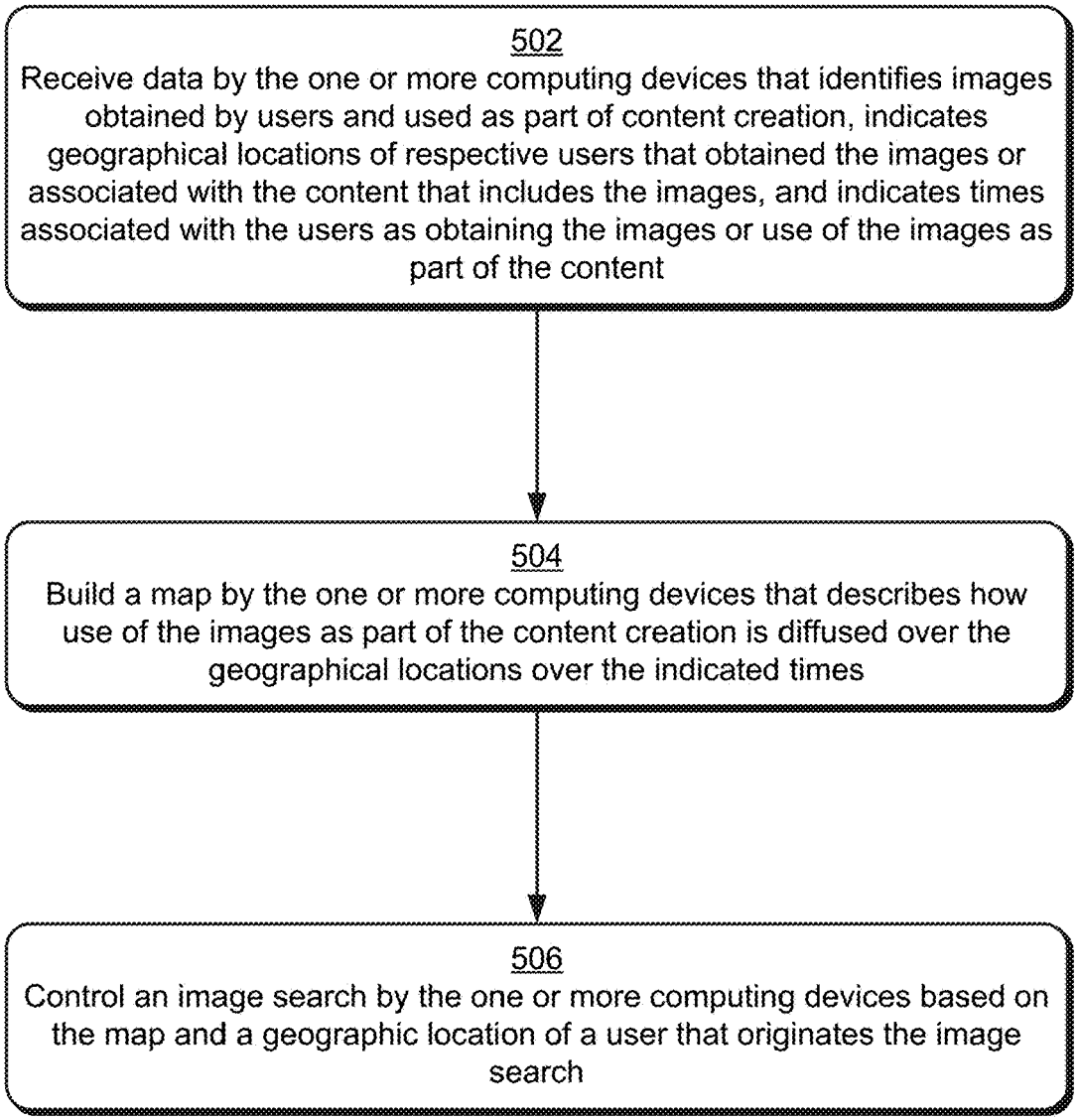
FIG. 5 is a flow diagram depicting a procedure in an example implementation in which image search control within a digital medium environment is described.

FIG. 5 depicts a procedure 500 in an example implementation in which image search control within a digital medium environment is described. Data is received by the one or more computing devices that identifies images obtained by users and used as part of content creation, indicates geographical locations of respective said users that obtained the images or associated with the content that includes the images, and indicates times associated with the users as obtaining the images or use of the images as part of the content (block 502). As before, this data may originate from monitored usage of a content sharing service 104 and/or a third-party service such as a social network service. In one or more implementations, the obtaining or use associated with the images involves content creation, such as to license the images from the content sharing service 104, included in content created by a user (e.g., a social network post) and so on. As such, this describes more than just inclusion in a previous search result but rather actual use of images by users as part of content, e.g., marketing campaigns, presentations, posts, and so forth.

A map is built by the one or more computing devices that describes how use of the images as part of the content creation is diffused over the geographical locations over the indicated times (block 504). The map 210, for instance, may describe how popularity of images or other content progresses from one geographic location to another over time.

An image search is controlled by the one or more computing devices based on the map and a geographic location associated with the image search (block 506). The search module 210, for instance, may leverage the map 210 as well as data that describes which images were obtained at particular points in time at respective geographic locations to configure a search result.

Figure 6:
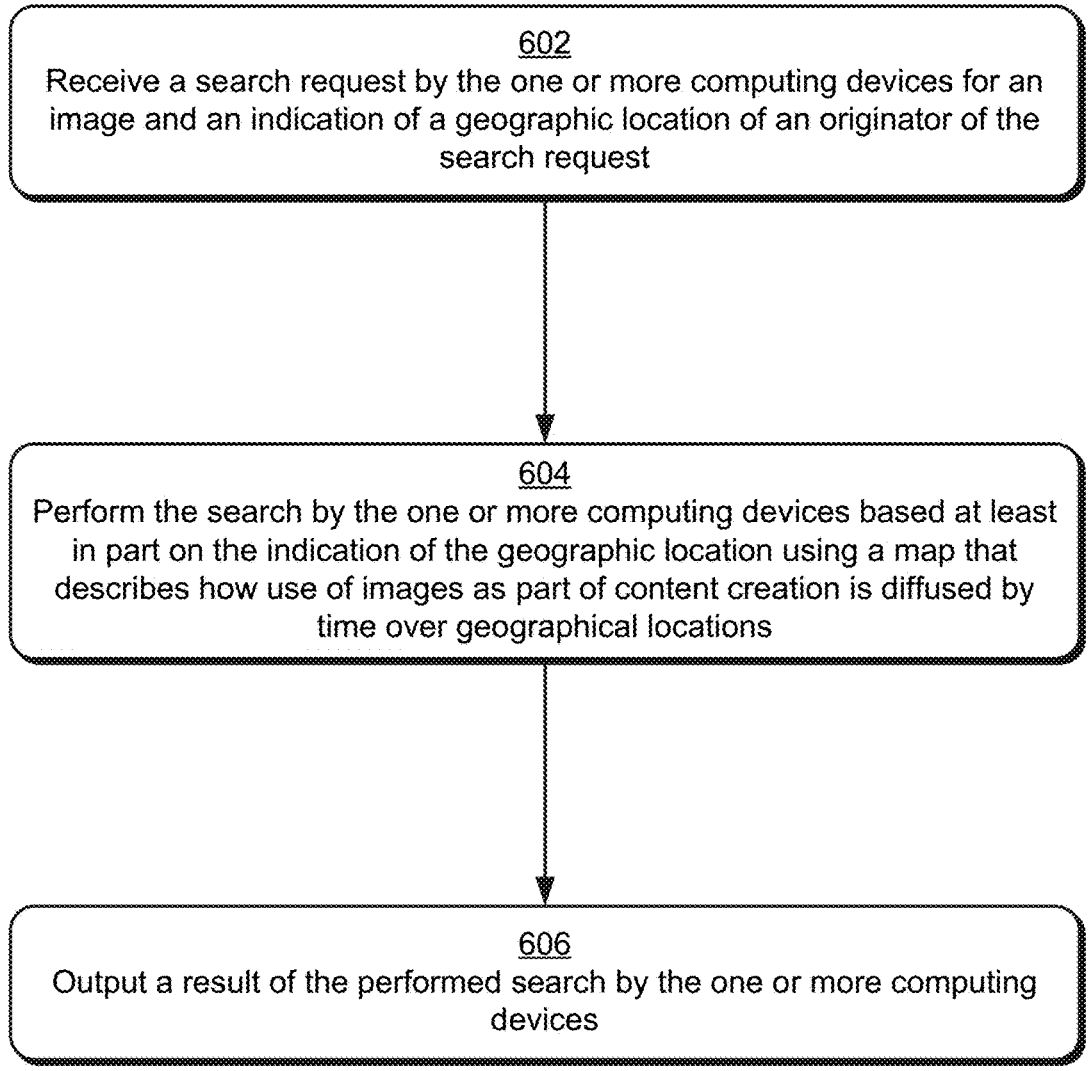
FIG. 6 is a flow diagram depicting another procedure in an example implementation in which image search control within a digital medium environment is described.

FIG. 6 depicts another procedure 600 in an example implementation in which image search control within a digital medium environment is described. A search request is received by the one or more computing devices for an image and an indication of a geographic location of an originator of the search request (block 602). The geographic location may be obtained in a variety of ways, such as based on an IP address of an originator of the search, manually specified by the user to refer to a target audience or client, and so on.

The search is performed by the one or more computing devices based at least in part on the indication of the geographic location using a map that describes how use of images as part of content creation is diffused by time over geographical locations (block 604). The map, as previously described, may describe a flow a content popularity from one location to another over time. This may then be leveraged to include images for one location based on use of the images at another location. A result of the performed search is caused to be output by the one or more computing devices (block 606), such as provided to transform a user interface to include the images. In one or more implementations, the user interface includes an option that is selectable to license use of desired images through the content sharing service 104.

Example System and Device

Figure 7:
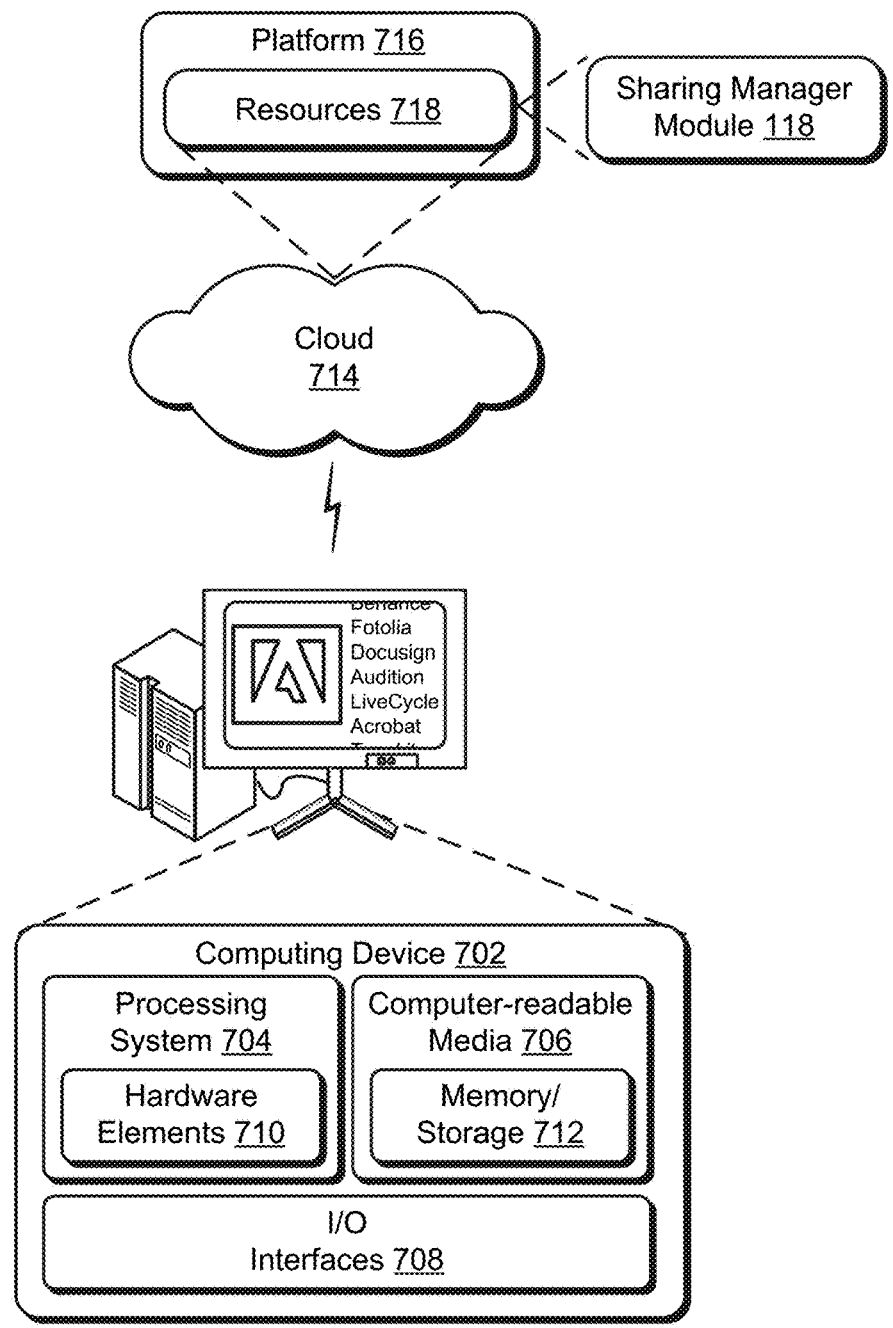
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the sharing manager module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for configuring image searches by one or more computing devices, a method comprising:
   receiving, by the one or more computing devices, data that:
      identifies images obtained from a content sharing service by users of the content sharing service; and
      describes, for each of the images, a geographic location and a time at which one of the users obtained the image from the content sharing service;
   generating, by the one or more computing devices, a mapping that describes how consumption of the images at a first geographic location during a first time period diffuses to consumption of the images at a second geographic location during a second time period; and
   controlling, by the one or more computing devices, an image search received from a device at the second geographic location, based on the mapping, to return at least one image in a result of the image search that is identified as trending at the first geographic location and not yet trending at the second geographic location when the image search is received.

2. The method described in claim 1, wherein the controlling is further performed based on an amount of time that has passed since the first time period, during which the image was trending at the first geographic location, the amount of time indicated by the mapping.

3. The method described in claim 1, wherein the second time period is different from and subsequent to the first time period.

4. The method described in claim 1, wherein the data is received from the content sharing service that makes the images available for licensing for the content creation.

5. The method described in claim 1, wherein the data describes usage of the images as part of content that includes posts of a social network service.

6. The method described in claim 1, wherein the controlling includes forming and transmitting a user interface for receipt and viewing by a user that originates the search request via a network.

7. In a digital medium environment for performing image searches by one or more computing devices, a method comprising:
   receiving, by the one or more computing devices, a search request for an image and an indication of a geographic location of a user of a content sharing service that originated the search request;
   performing, by the one or more computing devices, the search based at least in part on the indication of the geographic location using a mapping that describes how use of images obtained from the content sharing service is diffused by time over geographic locations; and
   outputting, by the one or more computing devices, a result of the performed search that includes at least one image that is identified based on an amount of time that has passed since the at least one image was obtained at another geographic location from the content sharing service, the amount of time being indicated by the mapping.

8. The method described in claim 7, wherein the performing is controlled such that the at least one image that is included in the result of the image search is identified as trending at the other geographic location and not yet trending at the geographic location of the user.

9. The method described in claim 7, wherein the diffusion described by the mapping indicates how consumption of the images at the other geographic location over a first time period relates to consumption of the images at the geographic location over a second time period, the second time period being different from and subsequent to the first time period.

10. The method described in claim 7, wherein the diffusion described by the mapping describes usage trends of the images as sequentially passing from a first geographic location to a second geographic location over time.

11. The method described in claim 7, wherein the mapping is generated from data received from the content sharing service that makes the images available for licensing for the content creation.

12. The method described in claim 7, wherein the mapping is also generated from data that describes usage of the images as part of content that includes posts of a social network service.

13. The method described in claim 7, wherein the outputting includes forming and transmitting a user interface for receipt and viewing by the user that originates the search request via a network.

14. In a digital medium environment for configuring image searches, a system comprising:
   a geographic consideration module implemented at least partially in hardware to build a mapping that describes how consumption of images at a first geographic location during a first time period diffuses to consumption of images at a second geographic location during a second time period from data that:
      identifies the images obtained by users of a content sharing service;
      indicates geographic locations of respective ones of the users that obtained the images; and
      indicates times when the respective ones of the users obtained the images; and
   a search module implemented at least partially in hardware to control an image search received from a device at the second geographic location based on the mapping and return at least one image that is identified as trending at the first geographic location and not yet trending at the second geographic location when the image search is received.

15. The system described in claim 14, wherein the search module is configured to perform the search based on an amount of time that has passed since the at least one image is trending at the first geographic location, the amount of time indicated by the mapping.

16. The system described in claim 14, wherein the second time period is different from and subsequent to the first time period.

17. The system described in claim 14, wherein the data is received from the content sharing service that makes the images available for licensing for the content creation.

18. The system described in claim 14, wherein the data describes usage of the images as part of content that includes posts of a social network service.

19. The system described in claim 14, wherein the at least one image is identified as trending responsive to determining that the at least one image has been obtained from the content sharing service by a threshold number of users.

20. The system described in claim 14, wherein the at least one image is identified as trending responsive to determining that the at least one image is associated with a threshold number of interactions, the interactions comprising at least one of a reply to, a share of, or a mention of the at least one image.

\* \* \* \* \*